United States Patent Office 3,444,949
Patented May 20, 1969

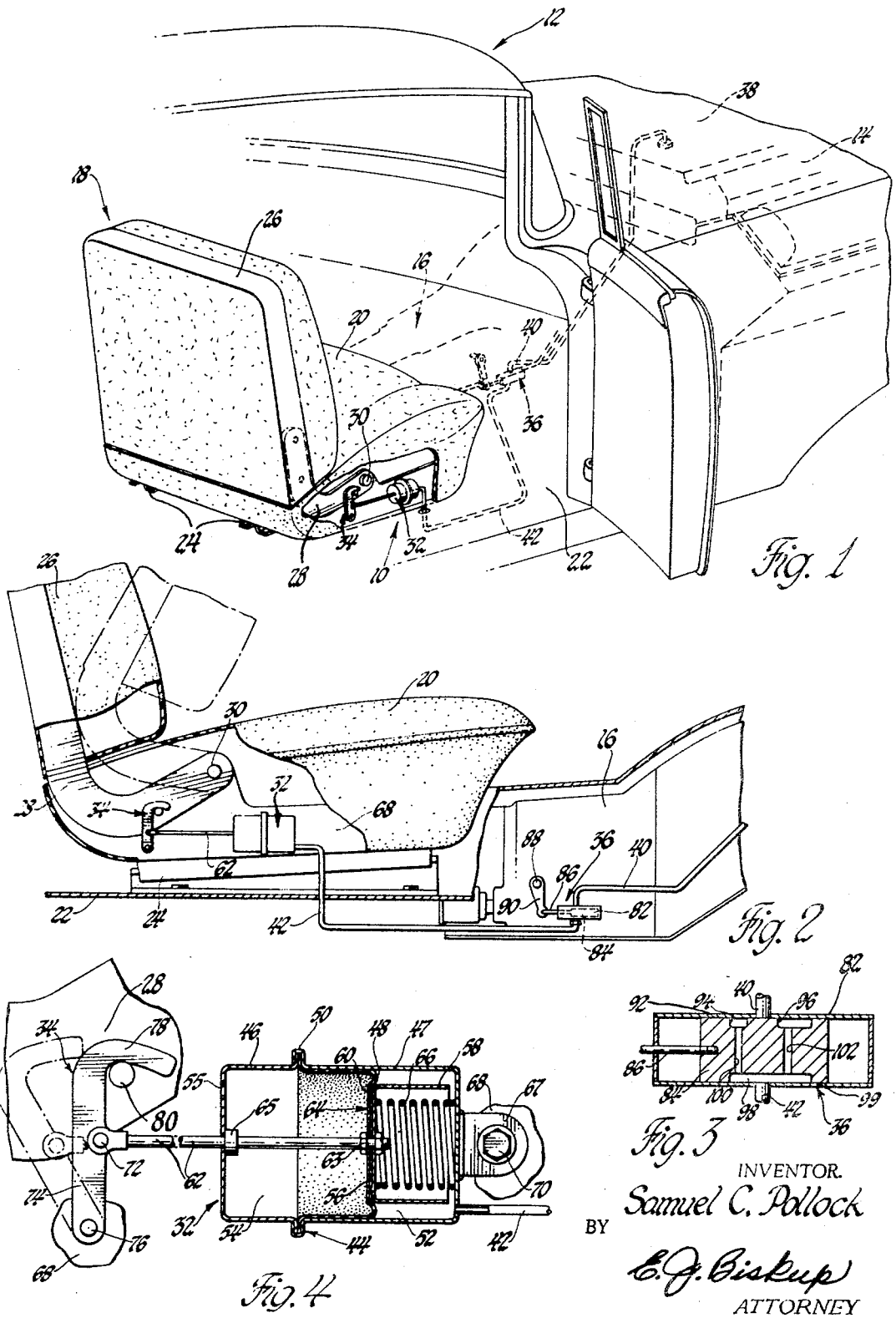

3,444,949
SAFETY LATCH FOR HINGED SEAT BACK
Samuel C. Pollock, Rochester, Mich., assignor to General Motors Corporation, Detroit, Mich., a corporation of Delaware
Filed July 28, 1967, Ser. No. 656,797
Int. Cl. B60r 21/00
U.S. Cl. 180—82                                     2 Claims

ABSTRACT OF THE DISCLOSURE

A seat back lock for a vehicle seating unit having a forwardly pivoting seat back wherein a vacuum motor, responsive to intake manifold vacuum and regulated by a valving mechanism connected to the transmission, operates a latching mechanism that securely anchors the seat back to the seating cushion whenever the engine is operating and the transmission is conditioned for drive.

---

Various manually or automatically operated locking devices have been used to prevent forward pivoting of a conventional folding seat back during periods of vehicle deceleration. As the name implies, the manually operated locks require actuation by the operator to lock or unlock the seat back. Most of the manual locking mechanisms now being used for the seating units of two-door vehciles are locked when the seat back is in the normal seating position. To gain entry to or exit from the rear seating compartment for the purposes of passenger seating or cargo storage, the operator must manually actuate the releasing mechanism. Unless the releasing mechanism is conveniently located and easily operable, the unlatching and folding of the seat back may be tedious and time consuming. As a practical matter, the seat back only needs to be anchored while the car is in motion.

The automatically operated seat back locks eliminate the difficulty of manually unlocking the seat back and permit free folding of the seat back when the vehicle is at rest. Generally, those designed to operate automatically are inertially responsive and remain in the unlocked position until a predetermined deceleration level is reached, even though the vehicle is in motion and being braked. Moreover, after a period of time, dirt and contaminants may impair the operations of the mechanism and significantly alter the deceleration level necessary for latching.

The seat back latching mechanism made in accordance with the present invention securely anchors the seat back even whenever the engine is operating and the transmission is in a driving gear. A latching hook, connected to the seating cushion, is adapted to engage a locking bar attached to the seat back to anchor the latter and is moved between a normally unlocked position and the locked position by a motor responsive to intake manifold vacuum. A valving mechanism, located in the conduit system connecting the motor to the intake manifold, is attached to the transmission. When the engine is operating and the transmission is in a driving gear, such as Drive, Low or Reverse, the valving mechanism is in an open position and the vacuum applied to the motor shifts the latching hook to the locked position. When the transmission is in a nondriving gear, such as Neutral or Park, the valving mechanism is closed and consequently the motor is inoperative and the latching hook shifts to or remains in the unlocked state. Additionally, the vacuum motor is inoperative when the vehicle engine is not operating regardless of the transmission setting.

Accordingly, the objects of the present invention are: to provide a latching mechanism for a folding seat back of a vehicle wherein the seat back is anchored whenever the vehicle is in motion; to securely anchor the folding seat back of a vehicle seating unit whenever the engine is operating and the transmisison is in a driving gear; to utilize a vacuum motor to operate a folding seat back latching mechanism in a manner wherein the latter is placed in a locked position whenever the vehicle engine is operating and the transmission is in a driving gear while permitting conventional folding of the seat back when the transmission is in Neutral or Park; and to provide a seat back latching mechanism wherein the latching mechanism is shifted between a normaly unlocked position and a locked position by a vacuum motor which is responsive to intake manifold vacuum and regulated by a valving mechanism connected with the transmission in a manner that permits the motor to be actuated only when the vehicle engine is running and the transmission is conditioned for drive.

These and other objects will be apparent to one skilled in the art upon reading the following detailed description, reference being made to the accompanying drawing in which:

FIGURE 1 is a perspective view showing the seat back latching mechanism of this invention installed in a motor vehicle;

FIGURE 2 is a side view of the latching mechanism shown in FIGURE 1;

FIGURE 3 is an enlarged side cross-sectional view of the valving mechanism shown in FIGURES 1 and 2; and FIGURE 4 is an enlarged side cross-sectional view of the vacuum motor and latching hook shown in FIGURES 1 and 2.

Referring now to FIGURES 1 and 2, the seat back latching mechanism 10, made in accordance with the present invention, is for use in a conventional motor vehicle 12 having an internal combustion engine 14, and a transmission 16. The latching mechanism 10 is located adjacent the outboard edge on the passenger's side of a conventional front seating unit 18 having a seating cushion 20 fixedly connected to a vehicle floor panel 22 by a suitable seat adjuster 24. The seating unit 18 also includes a folding seat back 26 that is conventionally attached by a hinge member 28 to the seating cushion 20 for a forward pivotal movement about a transverse hinge axis 30 and is designed to be locked to the seating cushion 20 by the latching mechanism 10 when the transmission is in a driving gear. The remaining description will proceed with reference to a single latching mechanism located on the passenger side of the vehicle, although it will be understood that a similar mechanism could be incorporated on the driver's side of the seating unit 18 or on all hinges in the case of spilt seat backs.

The latching mechanism 10 generally comprises a vacuum motor 32, a generally L-shaped latching hook 34, and a valving mechanism 36. As will be explained more fully below, when the engine 14 is operating and the transmission 16 is in a driving gear, the vacuum motor 32 and latching hook 34 are operatively connected to the intake manifold 38 of the engine 14 through conduits 40 and 42 and selectively connected with the vacuum therein by valving mechanism 36. The valving mechanism 36 may be eliminated so the motor 32 would operate whenever the engine is running. However, circumstances normally arise that require movement of the seat back when the engine is running but the vehicle is at rest. Therefore, a selective locking arrangement is preferred.

Referring to FIGURE 4, the vacuum motor 32 in general, comprises a cylindrical housing 44, including a cupped shaped cap 46 and base 47, and a flexible bellows-type rolling diaphragm 48. The outer periphery of the diaphragm is sealingly secured at annular flange 50 to divide the housing cavity into a vacuum chamber 52 connected to the intake manifold vacuum by conduit 42 and an air chamber 54 vented to atmosphere by aperture 55. The base 56 of the diaphragm 48 is interposed between a roller cup member 58 and a stiffening disk 60, all of which have suitable apertures formed therein so the diaphragm can be operatively connected to the threaded end of a push rod 62 by means of nuts 63 to form a piston assembly 64. The push rod 62 extends rearwardly through the rear surface of cap 46 and is supported for forward and rearward axial movement by bearing 65. When a vacuum is applied to the chamber 52, a pressure differential exists on opposite sides of the diaphragm 48 and, in a manner well known in the art, the piston assembly 64 moves forwardly to the locked position shown in FIGURE 4. When the vacuum supply is interrupted by the valving mechanism 36, a compression spring 66, axially interposed between the cup members 58 and the base 47, shifts the piston assembly 64 rearwardly. A bracket 67, fixedly connected to the front face of the base 47, is rotatably attached to the frame 68 of the seating cushion 20 by means of a bolt 70. The other end of the push rod 62 is pivotally connected by a clevis pin 72 to the latching hook 34. By providing a dual pivotable suspension for the vacuum motor 32, only axial forces are applied to the piston assembly 64 thereby eliminating any bending forces that might ordinarily be introduced by the arcuate movement of pin 72.

The latching hook 34 includes a straight portion 74, pivotally connected to frame 68 at point 76, and an upper hook portion 78 disposed at substantially right angles to portion 74. When a vacuum is applied to chamber 52, the diaphragm 48 and the push rod 62 move forwardly thereby rotating the latching hook 34 in a clockwise direction about point 76. A lock bar 80, attached to the hingle 28, is adapted to engage the latching hook 34 at the juncture of portions 74 and 78 to lock the seat back 26 against the pivotal movement relative to the seating cushion 20. When the vacuum supply is interrupted, spring 66 returns the push rod 62 and latching hook 34 rearwardly, and as is shown clearly in FIGURE 2, the seat back 26 is freely pivotably about its hinge axis 30.

As previously mentioned and as shown in FIGURE 3, the valving mechanism 36 regulates the vacuum supply to the motor 32 and comprises a casing 82, a valving block 84 and an actuating rod 86. The actuating rod 86 is connected to the manual selector shaft 88 of the transmission 16 by a link 90 so that, as the selector shaft 88 is rotated, the valving block 84 slides longitudinally within the casing 82. In this embodiment, the valving block 84, designed for an automatic transmission having the standardized Park-Reverse-Neutral-Drive-Low gear selection pattern, interconnects conduits 40 and 42 when the transmission 16 is in Reverse, Drive, or Low gears while preventing interconnection for Neutral or Park. The top surface 92 of the block 84 has laterally extending slots 94 and 96 formed therein. Slot 94 is adapted to register with conduit 40 when the transmission is in the Reverse gear while slot 96 is adapted to register with conduit 40 when the transmission is in Drive or Reverse. A laterally extending slot 98, formed in the bottom surface 99, is adapted to communicate with conduit 42 in all gear selection patterns except Reverse. Slots 94 and 96 are in communication with slot 98 by means of ports 100 and 102, respectively. As should be apparent, the vacuum chamber 52 is exposed to the manifold vacuum for the driving gears while the top surface 92 blocks off conduit 40 when the selector shaft 88 is in the Park or Reverse position. If rapid return of the locking hook 34 is desired for these positions, suitable venting may be provided in the valving block. The above described valve structure is not intended to be exhaustive of the design possibilities, and one skilled in the art could vary the structure according to design preferences and differing gear selection patterns, manual and automatic, without departing from the intended function.

Similarly, other vacuum responsive latching arrangements will become apparent. However, each latch, wherever located or however designed, should positively prevent pivotal movement of the seat back when the engine is operating and the transmission is in a driving gear.

What is claimed is:

1. A seat back locking mechanism for a motor vehicle including a transmission operatively connected to an internal combustion engine and an intake manifold at vacuum when the engine is operating, comprising a seating cushion transversely mounted within the vehicle, a seat back hinged to the seating cushion for pivotal movement about a transverse axis from a substantially vertical normal seating position to a forwardly folded position overlying the seating cushion, a latching bolt connected to the seat back, a latching hook pivotally connected to the seating cushion and movable between a locked position and an unlocked position, said latching hook adapted to engage the latching bolt in the locked position to prevent pivotal movement of the seat back about the transverse axis, a vacuum motor including a flexible diaphragm sealingly secured within a cavity formed in the vacuum motor, a conduit operatively connecting one side of the diaphragm to the intake manifold, a push rod operatively connecting the diaphragm to the latching hook, said diaphragm and push rod adapted to move said latching hook to the locked position when said one side is exposed to the intake manifold vacuum, spring means biasing the diaphragm to the normally unlocked position, and valving means located in the conduit and operatively connected to the transmission, said valve means adapted to be in an open position when the transmission is in a driving gear and in a closed position when the transmission is in a non-driving gear.

2. A seat back latching mechanism for a motor vehicle including a transmission operatively connected to an internal combustion engine having an intake manifold at vacuum when the engine is running, comprising; a seating cushion transversely mounted within the vehicle and having a seat back hinged thereto for forward pivotal movement about a transverse axis from a normal seating position; latch means movable between a normally unlocked position and a locked position, said latch means including a latch bolt connected to the seat back and a latching hook pivotally connected to the vehicle, said latching hook engaging said lock bolt in said normally locked position to prevent said forward pivotal movement of said seat back; spring means biasing said latch means to said unlocked position; a vacuum motor including a flexible diaphragm, said diaphragm having a first surface fluidly communicating with said intake manifold and the second surface exposed to atmosphere; connecting means operatively connecting the diaphragm to said latching hook for moving the latter to said locked position when said first surface of said diaphragm is exposed to vacuum; and valve means operatively connected to the transmission, said valve means being in an opened position when the transmission is in a driving gear to permit the vacuum motor to shift said latch means to said locked position and in a closed position when said transmission is in a non-driving gear whereby said spring means shifts said latch means to said unlocked position.

References Cited

UNITED STATES PATENTS

| | | | |
|---|---|---|---|
| 2,559,548 | 7/1951 | Seigneur | 296—63 |
| 2,732,003 | 1/1956 | Williams | 180—82 X |
| 2,815,796 | 12/1957 | Lobanoff. | |
| 2,901,053 | 8/1959 | Lassiter | 180—82 |
| 3,370,671 | 2/1968 | Stortz | 180—82 |
| 3,387,885 | 6/1968 | Boschen et al. | 297—379 |

KENNETH H. BETTS, *Primary Examiner.*

U.S. Cl. X.R.

296—65; 297—379